United States Patent [19]

Carraroli et al.

[11] Patent Number: 4,500,287

[45] Date of Patent: Feb. 19, 1985

[54] ROLLER TABLE FOR SINGLE-LAYER CERAMIC KILNS IN GENERAL

[75] Inventors: Dario Carraroli, Modena; Giordano Giavelli, Sassuolo, both of Italy

[73] Assignees: Carfer S.r.l., Modena; Officina Meccanica Giavelli S.p.A., Reggio Emilia, both of Italy

[21] Appl. No.: 441,905

[22] Filed: Nov. 15, 1982

[51] Int. Cl.[3] ......................... F27D 3/00; B65G 13/06

[52] U.S. Cl. ..................................... 432/246; 198/781

[58] Field of Search ......................... 432/246; 198/781

[56] References Cited

U.S. PATENT DOCUMENTS

| | | | |
|---|---|---|---|
| 3,567,010 | 3/1971 | Vom Stein | 198/781 |
| 3,605,990 | 9/1971 | Cowen, Jr. | 198/781 |
| 4,009,993 | 3/1977 | Marazzi | 432/246 |

*Primary Examiner*—John J. Camby

*Attorney, Agent, or Firm*—Brisebois & Kruger

[57] ABSTRACT

A roller table comprising a plurality of equidistant hollow metal or ceramic rollers, at the drive end of each one there being provided a friction clutch device, from the driven element of which there branch means for rotating the roller, together with retention means for this latter which are arranged to prevent its withdrawal from the respective firing tunnel.

11 Claims, 5 Drawing Figures

ROLLER TABLE FOR SINGLE-LAYER CERAMIC KILNS IN GENERAL

DESCRIPTION

The ceramic tile manufacturing industry has for some time used so-called single-layer firing kilns comprising a tunnel provided with a longitudinal roller table for transferring the material along this latter.

The known roller tables of this type, on which an alignment or layer of ceramic tiles to be fired is formed, comprise a plurality of equidistant hollow rollers, which can be either of metal or ceramic, and of which the opposite ends emerge beyond the side walls of the tunnel. Each roller is supported at one end by a pair of idle wheels, whereas its other end rests on a pair of drive wheels which are driven by a chain and respective sprocket wheels.

Under normal regular operating conditions, the friction between the pairs of drive wheels and the corresponding ends of the rollers enables these latter to be kept rotating and thus to transfer the material along the firing kiln. However, when two or more consecutive tiles along the alignment come into contact or become superposed, the forces in play become such that the drive wheels slip on the corresponding rollers, which remain stationary.

In less serious cases, correct operation of the roller table is restored automatically after only a short time, whereas in more serious cases action has to be taken from the outside with long spikes in order to avoid greater difficulties. Moreover, because the rollers of such known roller tables are simply rested on said opposing pairs of wheels, two opposing longitudinal retenation plates are fitted in order to prevent the rollers withdrawing laterally from the roller table.

The wide use of these roller conveyors in the aforesaid industry has brought to light the drawbacks summarised hereinafter. In this respect, it has been found that the rollers of such roller tables become halted not only for the said reasons relating to factors internal to the firing kiln, but also because of factors external to the kiln, for example when dirt, moisture, grease or other foreign bodies become deposited on the drive wheels or on the corresponding ends of the rollers, to lower the friction between said contacting parts until mutual slippage occurs, leading to stoppage of the rollers.

This also obviously leads to stoppage of the corresponding tiles, which then become struck by those upstream and can be irreparably damaged, this also possibly leading to the superposing of tiles, and the at least temporary stoppage of further rollers. Furthermore, these known roller tables have proved to be excessively complicated because of the presence of the two lateral roller retention plates.

The present invention provides a roller table for single-layer ceramic kilns which obviates the aforesaid drawbacks by means of a simple and rational constructional design.

According to the invention, the proposed roller table comprises, at the drive end of each component roller, a friction clutch device which is arranged to drive the corresponding roller during correct transfer of the material along the roller table, and is arranged to slip, with simultaneous stoppage of the roller, when transfer of the material is irregular.

According to a first embodiment, said friction clutch device comprises at least one elastically loaded ball which is slidable transversely to a rotatable pivot pin coaxial to the roller, and is partly inserted in a groove in a drive sprocket wheel which is driven by a chain and is mounted in the required position on the outer end of the pivot pin. The other end of said pivot pin comprises two appendices for driving the corresponding roller, and a resilient member arranged to prevent the roller withdrawing from its end supports.

According to a further embodiment, the sprocket and rotatable pivot pin are fixed together, and the friction clutch device is in the form of a spring of adjustable loading which acts on a ring rotatably mounted on the pivot pin and from which said drive appendices and resilient anti-withdrawal member project.

According to a further embodiment, the friction clutch device of the roller table according to the invention comprises at least one elastically loaded ball which is slidable transversely to the rotatable pivot pin and in the case of ceramic rollers is arranged for partial insertion into a seat in a resilient bush mounted on the pivot pin and locked on the roller, whereas in the case of metal rollers it is arranged for insertion into a seat in the roller, which is directly mounted on the pivot pin. In this specific case, the corresponding end of the roller is supported by the rotatable pivot pin, so that the support wheels are dispensed with, and said at least one ball acts as an anti-withdrawal member for the same roller.

The characteristics and constructional advantages of the invention will be more apparent from the detailed description given hereinafter with reference to the accompanying figures which illustrate certain details and preferred embodiments of the invention by way of non-limiting example.

Figure 1:
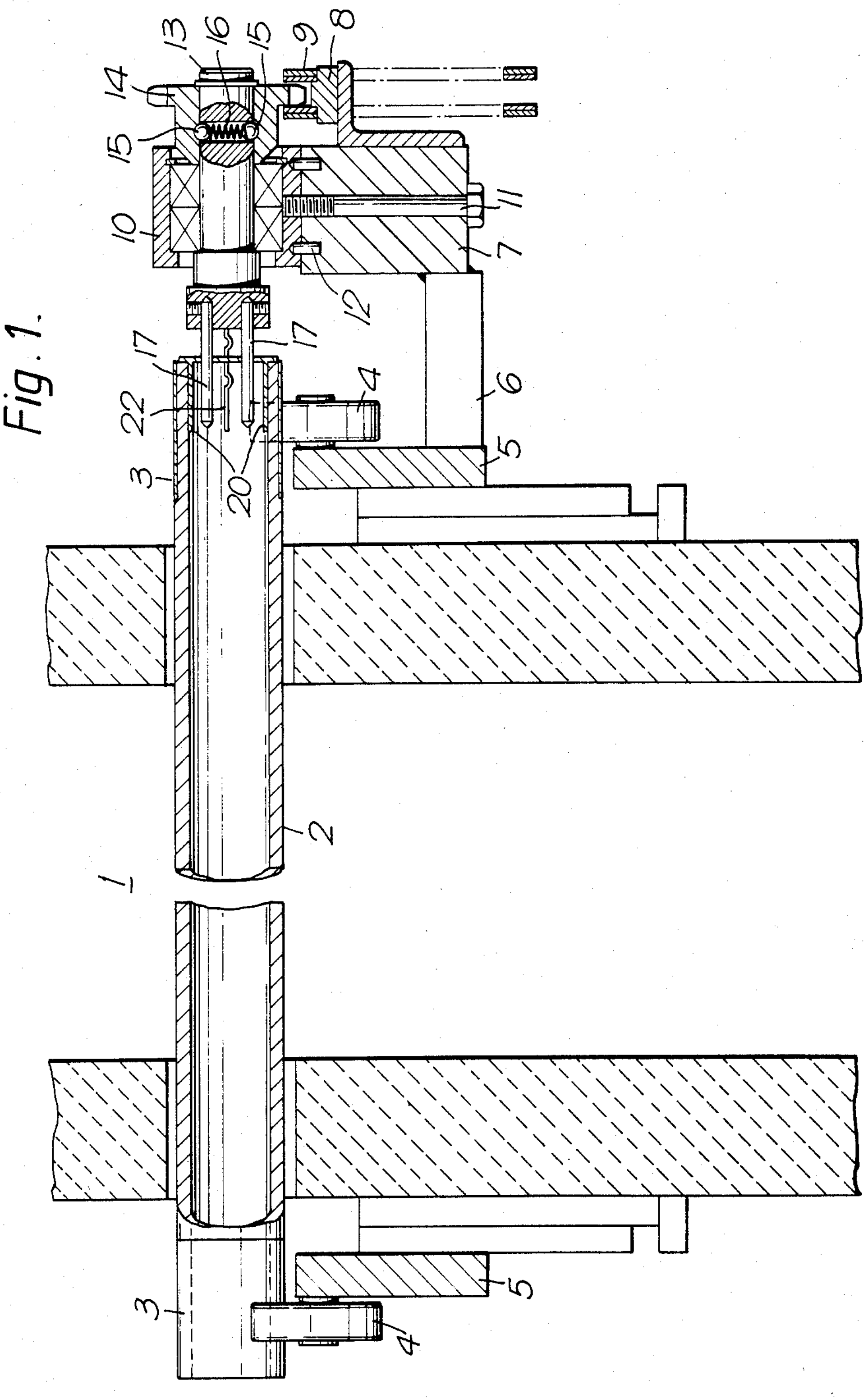
FIG. 1 is a cross-section through a first embodiment of the invention.
Figure 2:
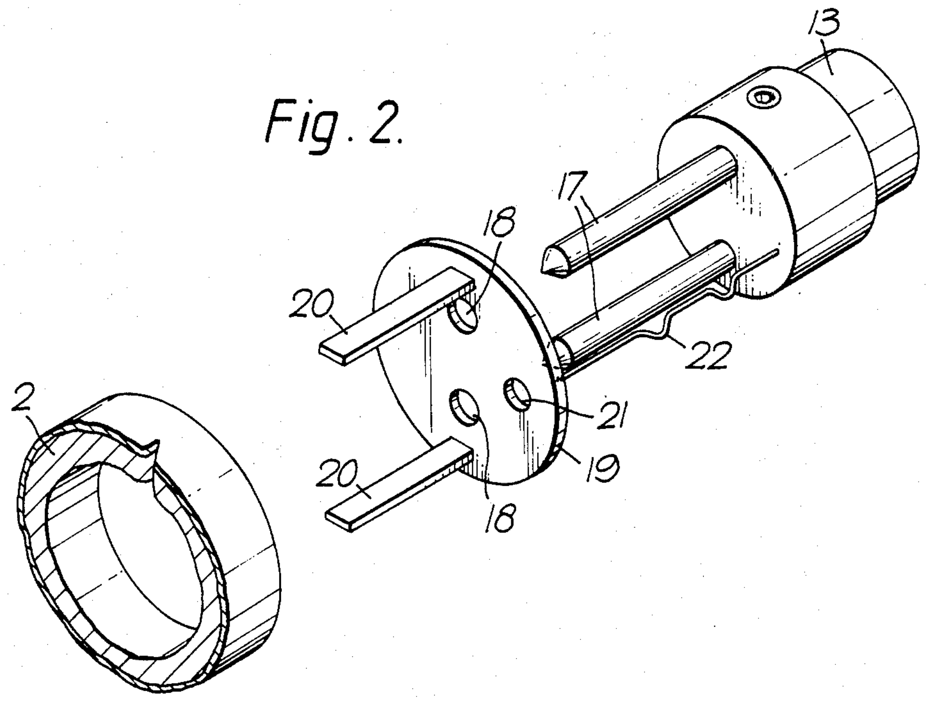
FIG. 2 is an exploded perspective view of the drive and antiwithdrawal members provided at the drive end of each roller of the roller table of FIG. 1.

Said figures, and in particular FIGS. 1 and 2, show a normal single-layer ceramic kiln comprising a firing tunnel 1 and a longitudinal roller table 2 for transferring the ceramic material through said tunnel. The roller table 2 is composed of a plurality of analogous equidistant hollow rollers which can be of metal, ceramic or any other material able to withstand the temperature in the tunnel 1.

In FIGS. 1 and 2, the roller 2 is of ceramic type, and its opposing ends emerge from the side walls of the tunnel where suitable apertures having a diameter greater than the roller diameter are provided. Said roller is covered on each end by a metal sleeve 3 which rests lowerly on two idle wheels 4 mounted on a longitudinal support 5 disposed outside the corresponding wall of the tunnel. From the longitudinal support 5, which is shown to the right in FIG. 1 and defines the drive side of the roller table according to the invention, there branches a ledge 6 which extends beyond the corresponding end of the roller 2 in order to support a bar 7. Instead of the bar, there can be provided a plurality of blocks rigid with the ledge, and of number equal to the number of rollers in the roller table.

A guide 8 for the upper rectilinear portion of a suitably motorised drive chain 9 is disposed to the side of the outer vertical wall of the bar, by way of a suitable support. On the bar 7 there is provided for each roller 2 a bearing 10, into the casing of which there is screwed from below a screw 11 passing freely through the bar. The correct positioning of the bearing is determined by two small pins 12 provided on the bar, and housed in respective seats in the bearing. This latter supports a rotatable pivot pin 13 coaxial to its roller 2 and having mounted in the required position on its outer end a sprocket wheel 14 which engages with the underlying chain 9.

In the through bore of the sprocket wheel there is provided a circumferential groove or channel which partially houses two opposing balls 15 slidably inserted in a diametrical bore of the pivot pin 13. A suitably loaded compression spring 16 is inserted between the two balls in the same diametrical bore.

When the sprocket wheel 14 is removed from the pivot pin 13, the balls 15 are prevented from escaping by suitable retention elements provided on the mouths of said diametrical bore. The balls 15 define a type of friction clutch between the sprocket wheel and pivot pin, said friction clutch being preset in such a manner as to enable the roller to be driven during correct transfer of the material along the tunnel, while being designed to slip, with consequent stoppage of the roller, when said transfer is irregular.

Several pairs of opposing balls 15 can also be provided, or alternatively it is also possible to provide for each diametrical bore of the pivot pin 13 a single ball, of which the elastic load due to the spring 16 can be adjusted by means of a grub screw provided in the opposite mouth of the respective diametrical bore. The inner end of each pivot pin 13 is in the form of an enlarged head from which there branch two pins 17 parallel to the axis of the pivot pin.

The ends of these pins are freely inserted, with a certain degree of slack, into two diametrically opposing circular apertures 18 provided in a disc 19 which closes the mouth of the roller 2 (FIG. 2). The disc 19 is locked axially and torsionally to the ceramic roller 2 by two resilient strips 20 forcibly inserted into the roller. The disc 19 is also provided, either outside or inside the circumference defined by the circular apertures 18, with a through bore 21 into which there is inserted a profiled retention member 22 branching from the pivot pin 13, and of which the purpose is to prevent the roller withdrawing from its supports 4.

As clearly shown, the retention member 22 is in the form of a piece of steel piano wire having two humped portions pointing in the same directions and designed to lie on one side and the other of the disc. The retention member 22 is inserted and withdrawn into and from said through bore 21 by snap action. The advantageous presence of the profiled wire 22 enables the two opposing plates used in the prior art for correctly retaining the rollers 2 on the wheel supports 4 to be dispensed with.

In the case of metal rollers, the elements of the invention remain unchanged, with the single exception of the sleeves 3, in that said metal rollers rest directly on the wheel supports 4.

At this point it should be noted that the replacement of a roller and the respective friction clutch device, or of only one of said two combined elements, is an extremely simple operation, this being contributed to by the advantageous arrangement of the endless chain 9 which lies entirely below the level of the roller table.

Figure 3:
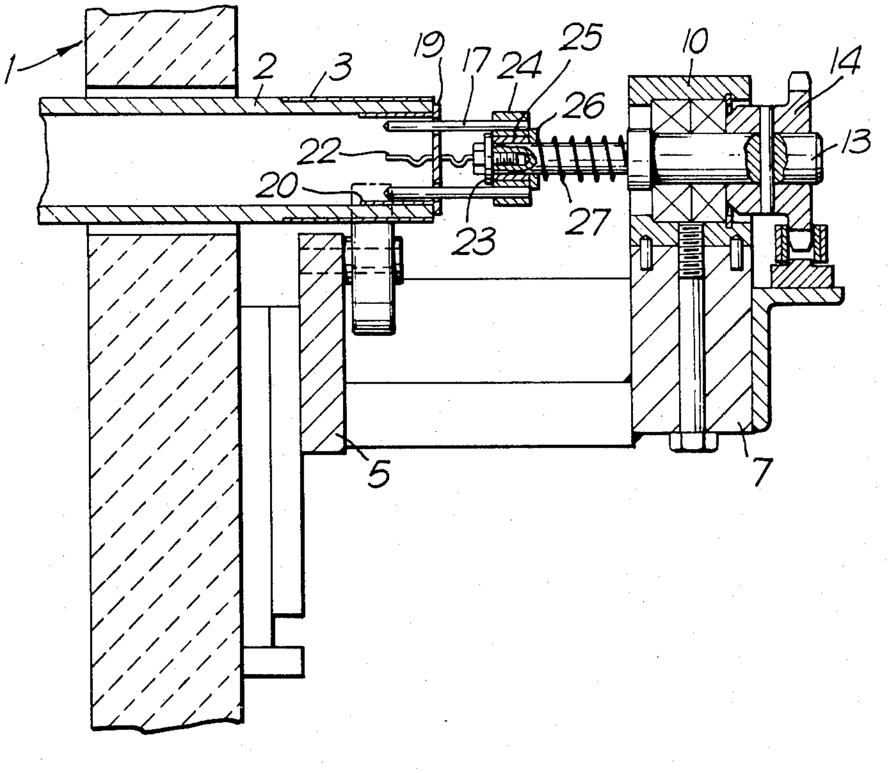
FIG. 3 is a partial cross-section through a further embodiment of the roller table.

The same advantageous results are also obtained in the case of a roller table according to the alternative embodiment shown in FIG. 3. The roller table is again composed of a plurality of ceramic rollers which are supported at each end by a pair of idle wheels. Said rollers can also be of metal or any other material able to withstand high temperature.

From said figure, it can be seen that the drive sprocket wheel 14 is fixed on the rotatable pivot pin 13, whereas the friction clutch device is provided at the inner end of the pivot pin 13. At this end, the pivot pin terminates in a cap 23 which acts as a support seat for a ring 24 rotatably mounted on the pivot pin by way of a self-lubricating bush 25. Against the ring 24 there presses a washer 26 on which there acts a compression spring 27 mounted on the pivot pin 13 and resting at its other end against a shoulder of said pivot pin. From the inner transverse face of the cap there branch two pins 17 and a profiled wire 22 which are inserted, as stated heretofore, into the disc 19 rigid with the roller 2.

As will be apparent, the friction generated by the described friction clutch device can be adjusted at will by disposing suitable spacers between the washer 26 and spring 27.

Figure 4:
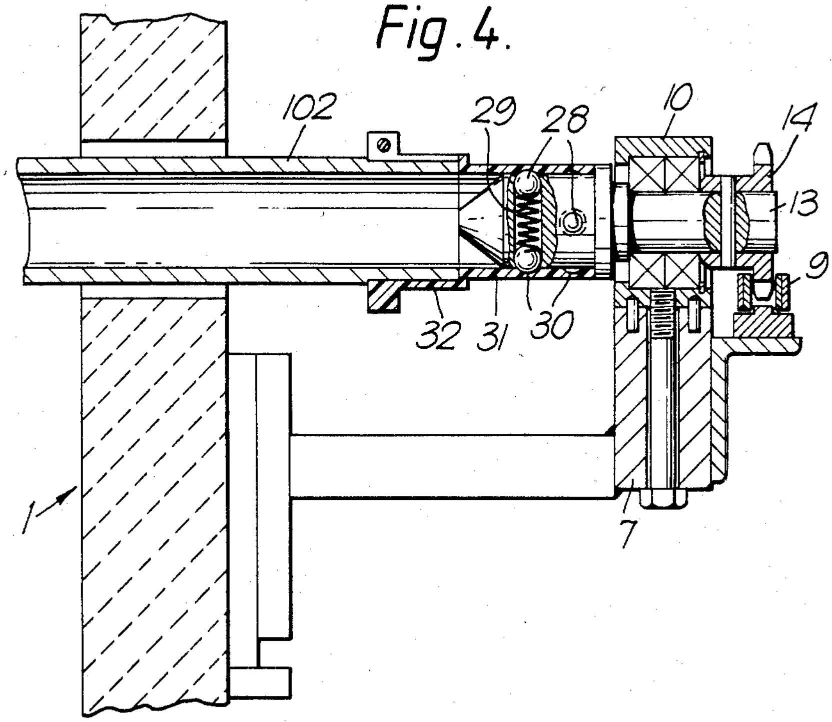
FIGS. 4 and 5 show a further embodiment of the invention which, as in the case of the preceding, can be used either for ceramic rollers or for metal rollers.
Figure 5:
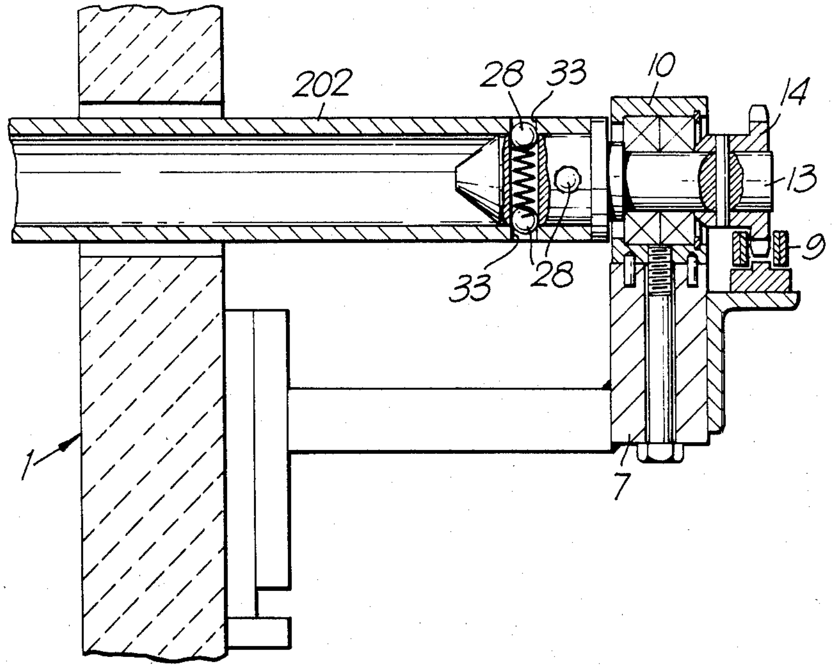

As in the preceding cases, the roller table shown in FIGS. 4 and 5 comprises a friction clutch device at the drive end of each component roller. In contrast to the preceding embodiments, in this specific case the free end of the roller is directly supported by the friction clutch device, so that the corresponding pair of idle wheels is dispensed with. Although not shown, it is apparent that the other end of each roller rests on two idle wheels.

It should be noted that by virtue of this type of support, which is certainly more rigid than the preceding, the roller table of FIGS. 4 and 5 is particularly suitable for single-layer ceramic kilns operating at relatively low temperature.

From FIG. 4 it can be seen that the sprocket wheel 14 is fixed on to the outer end of the rotatable pivot pin 13, whereas the friction clutch device is provided on the other end of said pivot pin. At this end, said pivot pin comprises two mutually othogonal adjacent diametrical through bores, in each of which two opposing balls 28 are slidably inserted. These latter are prevented from escaping from the corresponding bore by means of suitable inward projections at the mouths of these latter. Said two pairs of opposing balls are urged elastically outwards by respective springs 29, and are partly inserted into two circumferential grooves 30 provided on the inside of a collar 31. This latter is mounted in the required position on the pivot pin 13, and rests against a shoulder thereon.

From the inner end of the collar 31 there branches a bush 32 which is made resilient by means of a longitudinal slot and is locked by means of a screw on to the corresponding free end of a ceramic roller 102. As can be seen, a shoulder is provided between the collar and bush for the correct insertion of the ceramic roller. In FIG. 5, the exclusion of the collar 31 enables the same friction clutch to be used for metal rollers 202.

In this specific case, the balls 28 are partly inserted into suitable through bores 33 provided in the corresponding end of the metal roller 202. The through bores 33 can obviously be replaced by inner circumferential grooves.

It is also possible to make the friction force generated by the balls 28 adjustable by simply providing a single ball inside each diametrical bore of the pivot pin 13, and screwing a suitable grub screw into the opposite mouth of said diametrical bore so that it acts against the respective compression spring 29.

The invention is not limited to the described embodiments, and modifications and improvements can be made thereto without leaving the scope of the invention, the basic characteristics of which are summarised in the following claims.

We claim:

1. In a roller table for single-layer ceramic kilns of the type comprising a plurality of generally equidistant hollow metal or ceramic rollers, the opposite ends of which emerge from the respective side walls of a ceramic material firing tunnel of the kiln for rotation by a friction drive system comprising a chain, the improvement comprising outside the firing tunnel at the opposite ends of each of said rollers, a pair of spaced apart idle wheels for supporting the roller for rotation; each roller having a drive end, and at the drive end of each roller, a rotatable drive shaft generally coaxial with the roller and axially outwardly of the drive end; cooperating means between said drive shaft and said drive end for driving the roller to transfer material along the tunnel while leaving the roller free to expand axially as a result of thermal expansion, and cooperating means between said drive shaft and said drive end of the roller maintaining the roller in an operating position in the tunnel during operation of the kiln, and for permitting axial removal of the roller from the kiln by withdrawing the roller axially away from the shaft.

2. A roller table as claimed in claim 1 further comprising, a friction clutch on the shaft for driving the roller in response to driving movement of the chain.

3. A roller table as claimed in claim 2 wherein, said shaft is mounted for rotation in a removable bearing, a drive sprocket is fixed to said shaft, and said clutch means comprises, a ring on said shaft, and a compression spring pressing said ring against a rotatable sleeve on said shaft.

4. A roller table as claimed in claim 2 wherein said shaft is mounted on a removable bearing and has at least one diametrical bore, and said friction clutch means comprises a circumferential groove in an element surrounding the shaft and at least one ball in said diametrical bore which is elastically urged outwardly and engages in said circumferential groove.

5. A roller table is claimed in claim 4 wherein, said element having the circumferential groove comprises, a drive sprocket on said shaft, and said chain is beneath and drivingly engages said drive sprocket.

6. A roller table according to claim 3 further comprising, means for adjusting the clutch means by varying the pressure of the compression spring on the ring.

7. A roller table according to claim 1 wherein said cooperating means for permitting axial removal of a roller comprises a wire having two humped portions extending in the same direction and on opposite sides of a disc connected to the end of the roller, and means connecting the wire to the shaft against axial movement.

8. A roller table according to claim 1 wherein, said shaft is mounted for rotation in a removable bearing, a sprocket drives said shaft and said chain extends below the sprocket to facilitate upward removal of the shaft.

9. A roller table according to claim 1 wherein said cooperating means for driving the roller comprises first and second parallel drive pins connected to said shaft on opposite sides of the axis of the shaft at a location outwardly of the drive end of the roller, and a disc fixed to the drive end of the roller, said disc having openings aligned with said pins, said pins extending toward the roller and through the openings in the disc, said pins being movable axially in said openings to permit the roller to expand axially.

10. A roller table as claimed in claim 1 wherein said cooperating means for maintaining the roller in operating position and for permitting axial removal of the roller comprises, a snap together connection between the shaft and the drive end of the roller.

11. A roller table according to claim 10 wherein said snap together connection comprises a spring connected to the shaft.

* * * * *